(12) United States Patent
Emanuel et al.

(10) Patent No.: US 9,360,982 B2
(45) Date of Patent: Jun. 7, 2016

(54) GENERATING VISUALIZATIONS OF FACET VALUES FOR FACETS DEFINED OVER A COLLECTION OF OBJECTS

(75) Inventors: Barton W. Emanuel, Manassas, VA (US); Todd Leyba, Potomac, MD (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 13/461,650

(22) Filed: May 1, 2012

(65) Prior Publication Data
US 2013/0298050 A1 Nov. 7, 2013

(51) Int. Cl.
*G06F 3/048* (2013.01)
*G06F 3/0481* (2013.01)

(52) U.S. Cl.
CPC .............. *G06F 3/048* (2013.01); *G06F 3/0481* (2013.01)

(58) Field of Classification Search
CPC ............................... G06F 9/4443; G06Q 10/10
USPC ........................................................ 715/764
See application file for complete search history.

(56) References Cited

U.S. PATENT DOCUMENTS

| | | | |
|---|---|---|---|
| 7,228,302 B2 | 6/2007 | Kuchinsky et al. | |
| 7,305,390 B2 | 12/2007 | Bowman ........... | G06F 17/30675 |
| 7,437,370 B1 | 10/2008 | Ershov | |
| 7,475,072 B1 | 1/2009 | Ershov | |
| 7,493,319 B1 | 2/2009 | Dash et al. | |
| 7,529,743 B1 | 5/2009 | Ershov | |
| 7,580,719 B2 | 8/2009 | Karmarkar | |
| 7,752,534 B2 | 7/2010 | Blanchard, III et al. | |
| 8,015,188 B2 | 9/2011 | Gallivan et al. | |
| 8,275,399 B2 | 9/2012 | Karmarkar et al. | |
| 8,756,527 B2 | 6/2014 | Paasovaara | |

(Continued)

FOREIGN PATENT DOCUMENTS

| | | |
|---|---|---|
| CN | 101963966 A | 2/2011 |
| CN | 102279872 A | 12/2011 |

(Continued)

OTHER PUBLICATIONS

Cui, W., Y. Wu, S. Liu, F. Wei, and M.X. Zhou, "Context Preserving Dynamic Word Cloud Visualization", IEEE Pacific Visualisation Symposium, PacificVis IEEE, Mar. 2-5, 2010, Total 8 pp. [Also pp. 121-128].

(Continued)

*Primary Examiner* — Kieu Vu
*Assistant Examiner* — Joy M Weber
(74) *Attorney, Agent, or Firm* — David W. Victor; Konrad, Raynes, Davda & Victor LLP

(57) ABSTRACT

Provided are a computer program product, system, and method for generating visualizations of facet values for facets defined over a collection of objects. The objects are processed to determine facet values for the objects for a specified facet. A first visualization is generated of representations of the determined facet values for the objects. User selection is received of one of the facet values represented in the generated first visualization. A determination is made of objects having the user selected facet value and a determination is made of at least one facet value for the specified facet for each of the determined objects having the selected facet value. A second visualization of representations of the determined at least one facet value is generated.

26 Claims, 6 Drawing Sheets

(56) References Cited

U.S. PATENT DOCUMENTS

| | | | |
|---|---|---|---|
| 2007/0094592 | A1 | 4/2007 | Turner et al. |
| 2008/0072145 | A1 | 3/2008 | Blanchard et al. |
| 2008/0104040 | A1 | 5/2008 | Ramakrishna |
| 2008/0231644 | A1 | 9/2008 | Lempel et al. |
| 2009/0093275 | A1 | 4/2009 | Oh .................. G06F 3/0482 455/566 |
| 2009/0094190 | A1 | 4/2009 | Stephens |
| 2009/0094629 | A1 | 4/2009 | Lee et al. |
| 2009/0182727 | A1 | 7/2009 | Majko |
| 2009/0187846 | A1 | 7/2009 | Paasovaara |
| 2009/0287676 | A1 | 11/2009 | Dasdan |
| 2009/0287889 | A1 | 11/2009 | Abts et al. |
| 2009/0299725 | A1* | 12/2009 | Grigsby et al. .............. 704/2 |
| 2010/0030552 | A1 | 2/2010 | Chen et al. |
| 2010/0070860 | A1 | 3/2010 | Alkov ............. G06F 17/3082 715/716 |
| 2010/0088726 | A1 | 4/2010 | Curtis et al. |
| 2010/0127994 | A1 | 5/2010 | Aono ............. G06F 3/04886 345/173 |
| 2010/0131899 | A1 | 5/2010 | Hubert |
| 2010/0174743 | A1 | 7/2010 | Komano et al. |
| 2010/0229082 | A1 | 9/2010 | Karmarkar et al. |
| 2010/0241507 | A1 | 9/2010 | Quinn et al. |
| 2010/0250340 | A1 | 9/2010 | Lee et al. |
| 2010/0293270 | A1 | 11/2010 | Augenstein et al. |
| 2011/0029873 | A1 | 2/2011 | Eseanu et al. |
| 2011/0040562 | A1 | 2/2011 | Doyle et al. |
| 2011/0047145 | A1 | 2/2011 | Ershov |
| 2011/0137912 | A1 | 6/2011 | Ragusa et al. |
| 2011/0137921 | A1 | 6/2011 | Inagaki |
| 2011/0190035 | A1 | 8/2011 | Vanden Heuvel et al. |
| 2011/0196859 | A1 | 8/2011 | Mei et al. |
| 2011/0270937 | A1 | 11/2011 | Portilla |
| 2011/0276921 | A1 | 11/2011 | Long |
| 2011/0282855 | A1 | 11/2011 | Ronen et al. |
| 2011/0307482 | A1 | 12/2011 | Radlinski et al. |
| 2012/0005195 | A1 | 1/2012 | Cain, Jr. ............. G06F 17/30734 707/722 |
| 2012/0030232 | A1 | 2/2012 | John et al. |
| 2012/0030244 | A1 | 2/2012 | John et al. |
| 2012/0030368 | A1 | 2/2012 | John et al. |
| 2012/0084149 | A1 | 4/2012 | Gaudiano et al. |
| 2012/0167010 | A1 | 6/2012 | Campbell et al. |
| 2012/0200567 | A1 | 8/2012 | Mandel et al. |
| 2013/0007661 | A1 | 1/2013 | Klappert et al. |
| 2013/0084149 | A1 | 4/2013 | Ngo |
| 2013/0173533 | A1 | 7/2013 | Nichols |
| 2013/0253907 | A1 | 9/2013 | Castellanos et al. |

FOREIGN PATENT DOCUMENTS

| | | |
|---|---|---|
| EP | 2136301 A1 | 12/2009 |
| WO | 2011149454 A1 | 12/2011 |

OTHER PUBLICATIONS

IBM Corp., "Search and Text Analytics Collections in IBM Content Analytics", [online], [Retrieved on Mar. 29, 2012]. Retrieved from the Internet at <URL: http://www-01.ibm.com/support/docview.wss?uid=swg27015654>, Total 4 pp.

Nguyen, T.T., K. Chang, and S.C. Hui, "Word Cloud Model for Text Categorization", ICDM 11th IEEE International Conference on Data Mining, © 2011 IEEE, Total 10 pp. [Also Dec. 11-14, 2011, pp. 487-496].

The New York Times Company, "Most Searched New York Times Articles in the Past 30 Days—The New . . .", [online], [Retrieved on Mar. 6, 2012]. Retrieved from the Internet at <URL: http://www.nytimes.com/most-popular-searched?period=30&format=tag . . .>, Total 1 p.

Beavan, D., "ComPair: Compare and Visualise the Usage of Language", [online], [Retrieved on Jan. 23, 2012]. Retrieved from the Internet at: <URL: http://dh2011abstracts.stanford.edu/xtf/view?docId=tei/ab-309.xml;query=;brand=default>, Digital Humanities 2011: Jun. 19-22, Total 2 pp.

Beavan, D., "Glimpses through the Clouds: Collocates in a New Light", Digital Humanities 2008, Jun. 2008, Total 5 pp.

Exalead, "Exalead Blog—The Blog of Exalead", [online], [Retrieved on Oct. 21, 2011]. Retrieved from the Internet at: <URL: http://blog.exalead.com/2011/03/08/press-release-exalead-named-kmworld-100-companies-that-matter-for-sixth-straight-year>, Total 4 pp.

Iris, "Desktop IRIS Screenshots", [online], [Retrieved on Oct. 21, 2011]. Retrieved from the Internet at: <URL: http://www.irissearch.net/tour/desktop_screenshots1>, Total 1 p.

Kaptein, R., D. Hiemstra, and J. Kamps, "How Different are Language Models and Word Clouds?", University of Amsterdam, The Netherlands, ECIR 2010, LNCS 5993, Total 13 pp. [Also pp. 556-568].

Kaptein, R. and J. Kamps, "Word Clouds of Multiple Search Results", ACM Proceedings of The Second International Conference on Multidisciplinary Information Retrieval Facility, Jun. 2011, Total 16 pp.

Koutrika, G., Z.M. Zadeh, and H. Garcia-Molina, "Data Clouds: Summarizing Keyword Search Results over Structured Data", ACM EDBT, Saint Petersburg, Russia, Mar. 24-26, 2009, Total 12 pp.

Moran, M., "Listen to Your Customers to Adjust Your Keywords", [online], [Retrieved on Jan. 19, 2012]. Retrieved from the Internet at: <URL: http://www.searchengineguide.com/mike-moran/listen-to-your-customers-for-your-keywor.php>, © 1998-2012 K. Clough, Inc., Total 9 pp.

Rayson, P. and J. Mariani, "Visualising Corpus Linguistics", downloaded on Jan. 22, 2012 from ucrel.lancs.ac.uk/publications/cl20091/426_FullPaper.docx, Total 10 pp.

Wikipedia, "Tag Cloud", [online], [Retrieved on Jan. 20, 2012]. Retrieved from the Internet at: <URL: http://en.wikipedia.org/w/index.php?title_tag_cloud&printable=yes>, Total 6 pp.

Wordhoard, "Comparing Collocates", [online], [Retrieved on Jan. 23, 2012]. Retrieved from the Internet at <URL: http://wordhoard.northwestern.edu/userman/analysis-comparingcollocates.html>, Total 6 pp.

Zhu, W., A. Iwai, T. Leyba, J. Magdalen, K. McNeil, T. Nasukawa, N. Patel, and K. Sugano, "IBM Content Analytics Version 2.2: Discovering Actionable Insight from Your Content", May 2011, Total 698 pp.

U.S. Appl. No. 13/397,596, filed Feb. 15, 2012, entitled "Generating Visualizations of a Display Group of Tags Representing Content Instances in Objects Satisfying a Search Criteria", invented by Chitiveli, S.V., and B.W. Emanuel, Total 33 pp. [57.255 (Appln)].

U.S. Appl. No. 13/397,596, dated Oct. 22, 2013, 16 pp. [57.255 (NOA1)].

Response to Final Office Action 1 for U.S. Appl. No. 13/397,596, dated Aug. 19, 2013, 10 pp. [57.255 (RFOA1)].

Office Action 1, Dec. 4, 2012, for U.S. Appl. No. 13/397,596, filed Feb. 15, 2012 by S.V. Chitiveli et al., Total 25 pp. [57.255 (OA1)].

Preliminary Remarks, May 3, 2012, for U.S. Appl. No. 13/463,318, filed May 3, 2012 by S.V. Chitiveli et al., Total 1 p. [57.255C1 (PrelimRemarks)].

U.S. Appl. No. 13/463,318, filed May 3, 2012, entitled "Generating Visualizations of a Display Group of Tags Representing Content Instances in Objects Satisfying a Search Criteria", invented by Chitiveli, S.V., and B.W. Emanuel, Total 52 pp. [57.255C1 (Appln)].

English Abstract and Machine Translation for CN101963966A1, published on Feb. 2, 2011, Total 3 pp.

International Search Report & Written Opinion, Jul. 4, 2013, for PCT/IB2013/050754, Total 9 pp.

US Publication No. 2011/0307482, dated Dec. 15, 2011, is an English language equivalent of CN102279872A.

Amendment 1, Mar. 4, 2013, for U.S. Appl. No. 13/397,596, filed Feb. 15, 2012 by S.V. Chitiveli et al., Total 13 pp. [57.255 (Amend1)].

Final Office Action 1, Jun. 4, 2013, for U.S. Appl. No. 13/397,596, filed Feb. 15, 2012 by S.V. Chitiveli et al., Total 13 pp. [57.255 (FOA1)].

Notice to File Corrected Application Papers, Mar. 2, 2012, for U.S. Appl. No. 13/397,596, filed Feb. 15, 2012 by S.V. Chitiveli et al., Total 2 pp. [57.255 (NFCAP)].

Response to Notice to File Corrected Application Papers, Mar. 29, 2012, for U.S. Appl. No. 13/397,596, filed Feb. 15, 2012 by S.V. Chitiveli et al., Total 34 pp. [57.255 (Rsp NFCAP)].

(56) References Cited

OTHER PUBLICATIONS

Office Action 1, Jan. 14, 2014, for U.S. Appl. No. 13/463,318, filed May 3, 2012 by S.V. Chitiveli et al., Total 38 pp. [OA1 (57.255C1)].
Final Office Action, Apr. 28, 2014, for U.S. Appl. No. 13/463,318, filed May 3, 2012 by S.V. Chitiveli et al., Total 16 pp. [57255C1 (FOA)].
Advisory Action, Aug. 6, 2014, for U.S. Appl. No. 13/463,318, filed May 3, 2012 by S.V. Chitiveli et al., Total 3 pp. [57.255C1 (AdvAct)].
Response to Final Office Action 1, Jul. 28, 2014, for U.S. Appl. No. 13/463,318, filed May 3, 2012 by S.V. Chitiveli et al., Total 14 pp. [57.255C1 (RFOA1)].
Notice of Allowance, Sep. 25, 2014, for U.S. Appl. No. 13/463,318, filed May 3, 2012 by S.V. Chitiveli et al., Total 14 pp. [57.255C1 (NOA)].
U.S. Appl. No. 14/559,822, filed Dec. 3, 2014, entitled "Generating Visualizations of a Display Group of Tags Representing Content Instances in Objects Satisfying a Search Criteria", by S.V. Chitiveli, et al., Total 54 pp. [57.255C2 (Appln)].
Preliminary Remarks for U.S. Appl. No. 14/559,822, filed Dec. 3, 2014 by S.V. Chitiveli et al., Total 2 pp. [57.255C2 (PrelimRemarks)].
Office Action 1, Nov. 9, 2015, for U.S. Appl. No. 14/559,822, filed Dec. 3, 2014 by S.V. Chitiveli et al., Total 26 pp. [57.255C2 (OA1)].
Response to Office Action 1, Feb. 9, 2016, for U.S. Appl. No. 14/559,822, filed Dec. 3, 2014 by S.V. Chitiveli et al., Total 11 pp.
Response to Office Action 3, Nov. 16, 2015, for U.S. Appl. No. 13/461,650, filed May 1, 2012 by B.W. Emanuel et al., Total 15 pp.

* cited by examiner

GENERATING VISUALIZATIONS OF FACET VALUES FOR FACETS DEFINED OVER A COLLECTION OF OBJECTS

BACKGROUND OF THE INVENTION

1. Field of the Invention

The present invention relates to a computer program product, system, and method for generating visualizations of facet values for facets defined over a collection of objects.

2. Description of the Related Art

Data and text analytics systems provide for the definition of dimensions or facets for objects stored in a repository. A text analytics system processes the objects to determine dimension or facet values from the object content. The facet values may be determined from structured fields in the object or by performing text mining of the object content to determine attributes of the object, such as attributes of the text. In the current art, the user may display the facet values for the facets determined for a collection of documents. Such visualizations generally render the results for one or two facets. Further, dashboards are used to provide visualizations of several dimensions. The dashboards may include various types of graphic controls for abstraction by users of analytics systems.

There is a need in the art for improved techniques for presenting visualizations of facet values to users to improve the ability of users to make cognitive associations among the objects based on their facets.

SUMMARY

Provided are a computer program product, system, and method for rendering information on facets associated with objects. The objects are processed to determine facet values for the objects for a specified facet. A first visualization is generated of representations of the determined facet values for the objects. User selection is received of one of the facet values represented in the generated first visualization. A determination is made of objects having the user selected facet value and a determination is made of at least one facet value for the specified facet for each of the determined objects having the selected facet value. A second visualization of representations of the determined at least one facet value is generated.

DETAILED DESCRIPTION

Described embodiments provide visualizations of facet values for facets associated with objects in an object collection. A user may select one or more facet values, and the facet values for the one or more user selected facets may be visualized in one or more display regions, such as word clouds. There may be one defined display region to visualize facet values for one of the facets, including the user specified facet. A user may select one or more facet values in the visualization to cause a determination to be made of objects including the selected one or more facet values. A determination is then made of the facet values in the determined objects for the one or more user selected facets to present in a new visualization of facet values for the objects. The user may drill down and select different facets and facet values for which visualizations of the facet values will be presented to the user in one or more display regions. The described embodiments provide different ways to visualize facet values for objects to assist the user in making useful cognitive associations of the facet values for objects.

Figure 1:
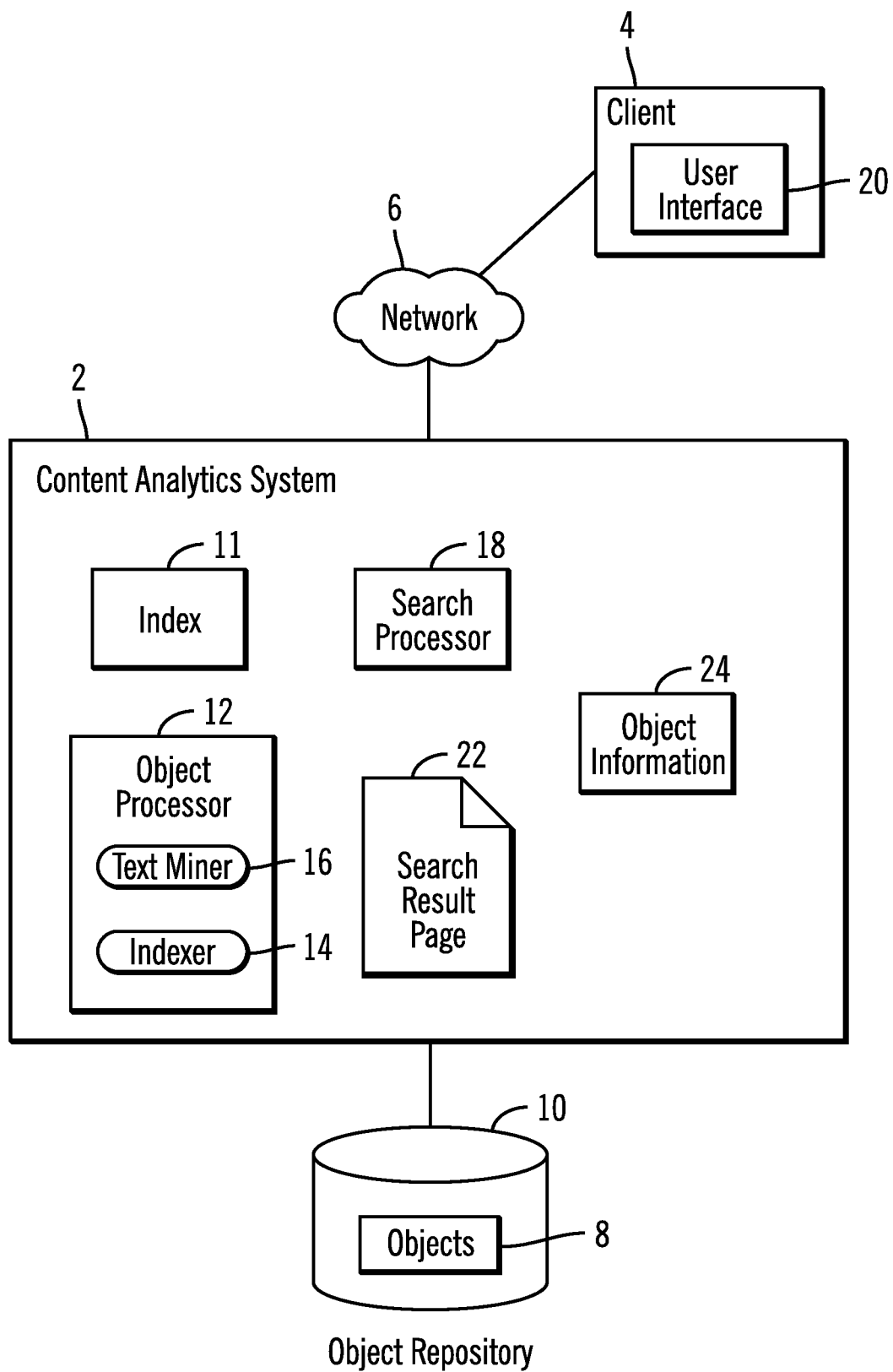
FIG. 1 illustrates a computing environment in which embodiments are implemented.

FIG. 1 illustrates an embodiment of a content analytics system 2 to process search requests from clients 4 over a network 6 for objects 8 maintained in a repository 10. The objects 8 may comprise textual documents, multi-media content with textual metadata, a database, and other data. The content analytics system 2 includes a search index 11 providing a listing of the content, such as words and text, in the objects 8. The index 11 may provide entries for terms and content in the objects 8 and indicate the objects 8 that include that indexed content. Further, the index 8 may include entries for facet values for facets or dimensions and indicate the objects 8 that are determined to have the facet value. The content analytics system 2 further maintains object information 24 having information on the objects 8 in the repository 10.

An object processor 12 includes an indexer 14 to crawl the objects 8 to perform the indexing to generate the index 11. The object processor 12 may further include a text miner 16 to apply text analytics to the objects 8 to determine facet values for facets or dimensions associated with the objects 8 in a collection. The text miner 16 may determine facet values for facets from structured data fields in the objects 8 or populated with information from the object content 6, such as the text, media, etc. Text analytics provides techniques to convert textual data into structured data by extracting information from the text, e.g., person names, addresses, etc. and classifying content into categories based on the text and content referred to as facets. A facet may comprise a specific type of information to be determined from the object 8. The facet value may comprise an instance of text or content in the object 8 of the facet type or may be determined by mining the object 8 content. For instance, if the facet is nouns, then the facet values would comprise all nouns in the object 8. If the facet is a date, then the facet values would comprise all dates and date ranges mentioned in the object 8. If the facet concerned an automobile type, then the facet value would comprise all automobile types mentioned in the object 8. Facets may comprise dimensions or classifications such that the facet values for the facets are determined by processing the object 8 using text analytics and data mining techniques. For instance, the facet may comprise a tone of content in the object determined by text analytics, which processes the text to determine whether the tone (facet value) is hostile, humorous, angry, remorseful, sad, etc.

The text miner 16 may comply with the Unstructured Information Management Architecture (UIMA), and include such annotators as a language identification annotator to identify the language of each object 8; a linguistic analysis annotator to apply linguistic analysis to the objects 8; a dictionary lookup annotator to match words and synonyms from a dictionary with words in the content of the objects 8 and to associate keywords with user-defined facets; a named entity recognition annotator to extract person names, locations, and company names.

A search processor 18 receives search requests from a user interface 20 of the client 4 objects satisfying certain criteria, such as objects 8 having facet values for user selected facets and/or facet values. The search processor 18 may use the index 11 to determine objects 8 having facet values that satisfy a user selected facet or facet value. The search processor 18 may use the index 11 to determine facet values to represent in a visualization of facet values to return to the client user interface 20. The search processor 18 may generate a search result page 22 providing a visualization of the facet values for a specified one or more facets. The visualization may comprise a word cloud, panel, dashboard, box, etc., including representations of the determined facet values satisfying the search criteria.

The repository 10 may comprise one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, flash disk, storage-class memory (SCM)), electronic memory, magnetic tape media, tape cartridges, etc. The components of the content analytics system 12, 14, 16, and 18 may comprise software programs in a memory executed by a processor. In an alternative embodiment, some portion or all of the programs may be implemented in a hardware component, such as a dedicated integrated circuit, e.g., Application Specific Integrated Circuit (ASIC), expansion card, etc.

Figure 2:
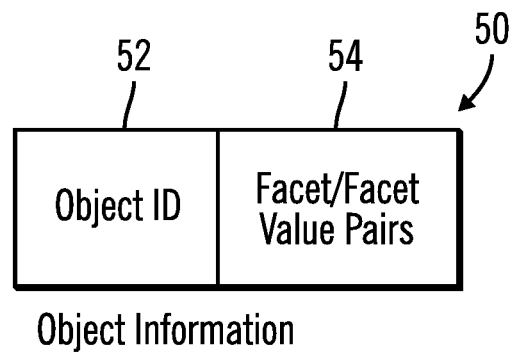
FIG. 2 illustrates an embodiment of object information.

FIG. 2 illustrates an embodiment of object information 50 for one of the objects 8 in the object information 24 including an object identifier (ID) 52 and one or more facet/facet value pairs 54, each providing one or more facet values for a facet.

Figure 3:
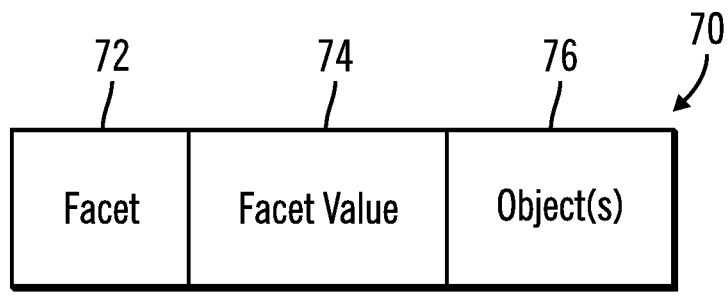
FIG. 3 illustrates an embodiment of an index entry for a facet value.

FIG. 3 illustrates an embodiment of an index entry 70 for facet values in the index 11, where the index entry indicates a facet 72, a facet value 74 for the facet 72 and one or more objects 76 that have the facet value 74 for the facet 72. The index 11 may further include entries 70 for content instances in the objects, to provide for each content instance, such as text, the objects that include that content instance.

Figure 4:
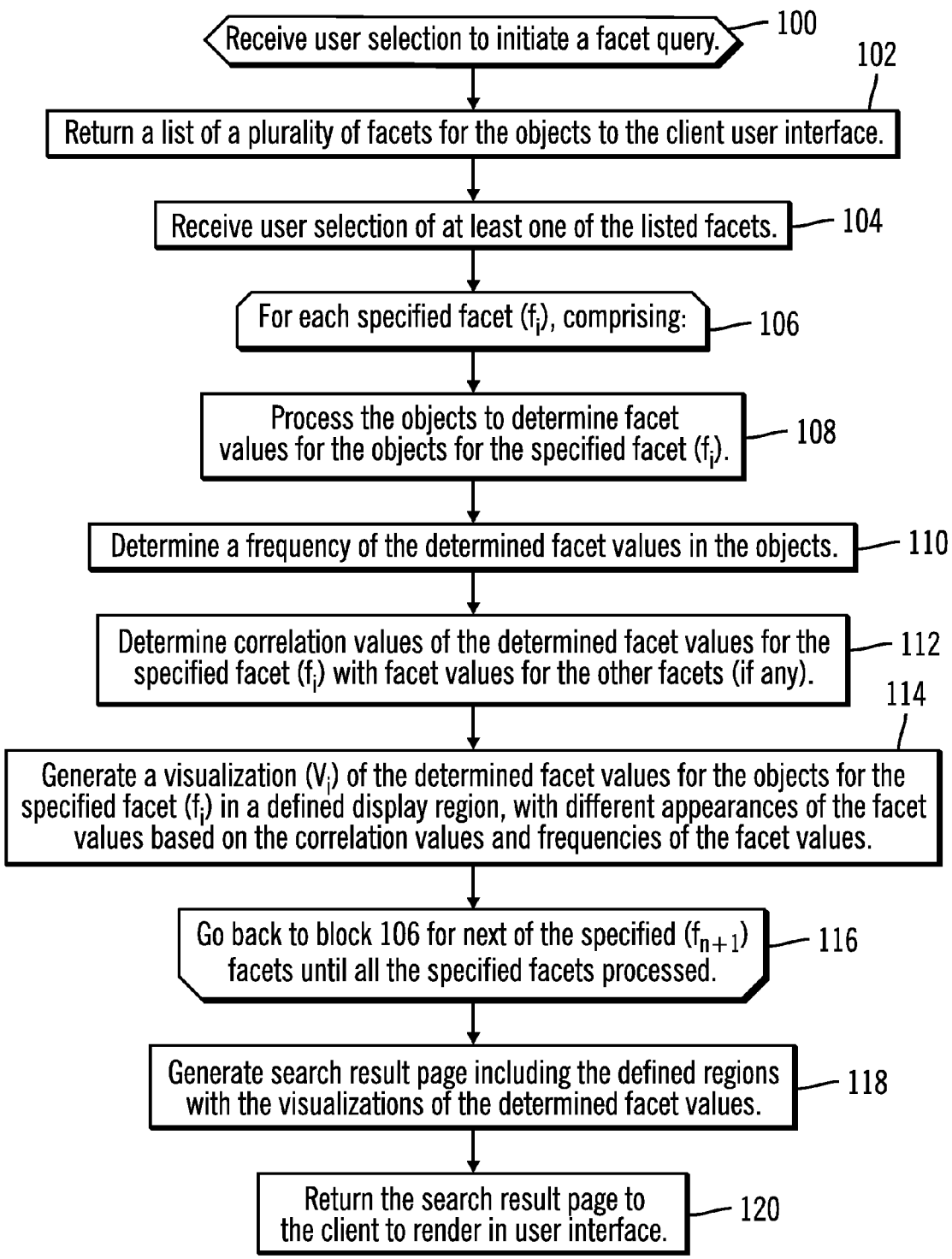
FIG. 4 illustrates an embodiment of operations to provide a visualization of facet values for a user selected facet.

FIG. 4 illustrates an embodiment of operations performed by the search processor 18, or other component of the content analytics system 2, to generate facet search results for a client 4. Upon receiving (at block 100) user selection to initiate a facet query from one of the clients 4, the search processor 18 returns (at block 102) a list of a plurality of facets for the objects 8 to the client user interface 20. Upon receiving (at block 104) user selection of at least one of the facets in the list, the search processor 18 performs a loop (at blocks 106-118) of the operations at blocks 108 through 116 for each specified facet (fi) that the user selected, which comprises one or more of the facets. The search processor 18 processes (at block 108) the objects 8 to determine facet values for the objects for the specified facet (fi) for those objects having a value for the specified facet (fi) 72. The index 11 may be processed to find index entries 70 for facet values 74 for the specified facet 72, and then the objects 8 having those facet values are determined from field 76 of the index entries 70 for the facet values 74 of the specified facet (fi).

The search processor 18 may determine (at block 110) a frequency of the determined facet values for the specified facet ($f_i$) in the objects 8. The text miner 16 may determine (at block 112) correlation values of the determined facet values for the specified facet ($f_i$) with facet values for the other facets (if any) in the objects 8. The correlation values may indicate how two facets correlate with one another. Correlation values between different facet values may be determined using content analytics. The search processor 18 generates (at block 114) a visualization ($V_i$) of the determined facet values for the objects for the specified facet ($f_i$) in a defined display region, such as a word cloud. The appearances of the facet values in the display region may be varied based on the correlation values and frequencies of the facet values. For instance, more frequently occurring facet values in the objects 8 may be displayed in a larger font relative to less frequently occurring facet values and facet values having higher correlation values for correlation with other facet values for other facets may be displayed in darker shades of a color, such as more bold, than facet values having lower correlation values. In this way, the appearance of the displayed facet values may be varied along two dimensions, color and font size, to visually indicate the frequency and correlation of those facet values. After generating the visualization ($V_i$), control proceeds (at block 116) back to block 106 if there are further specified facets ($f_i$) for which to generate visualizations or proceeds to block 118 if all specified facets have been considered. The generated visualizations may comprise code providing an implementation of the visualizations and/or graphics output rendered in a memory or storage of the content analytics system 2.

After generating defined display regions for the visualizations ($V_i$) for the different facets ($f_i$), the search processor 18 may generate (at block 118) a search result page 2 including the defined regions with the visualizations of the determined facet values and return (at block 120) the search result page 22 to the client user interface 20. The search result page 22 may indicate for each visualization ($V_i$) in a defined display region the specified facet for which the facet values in are generated.

Figure 5:
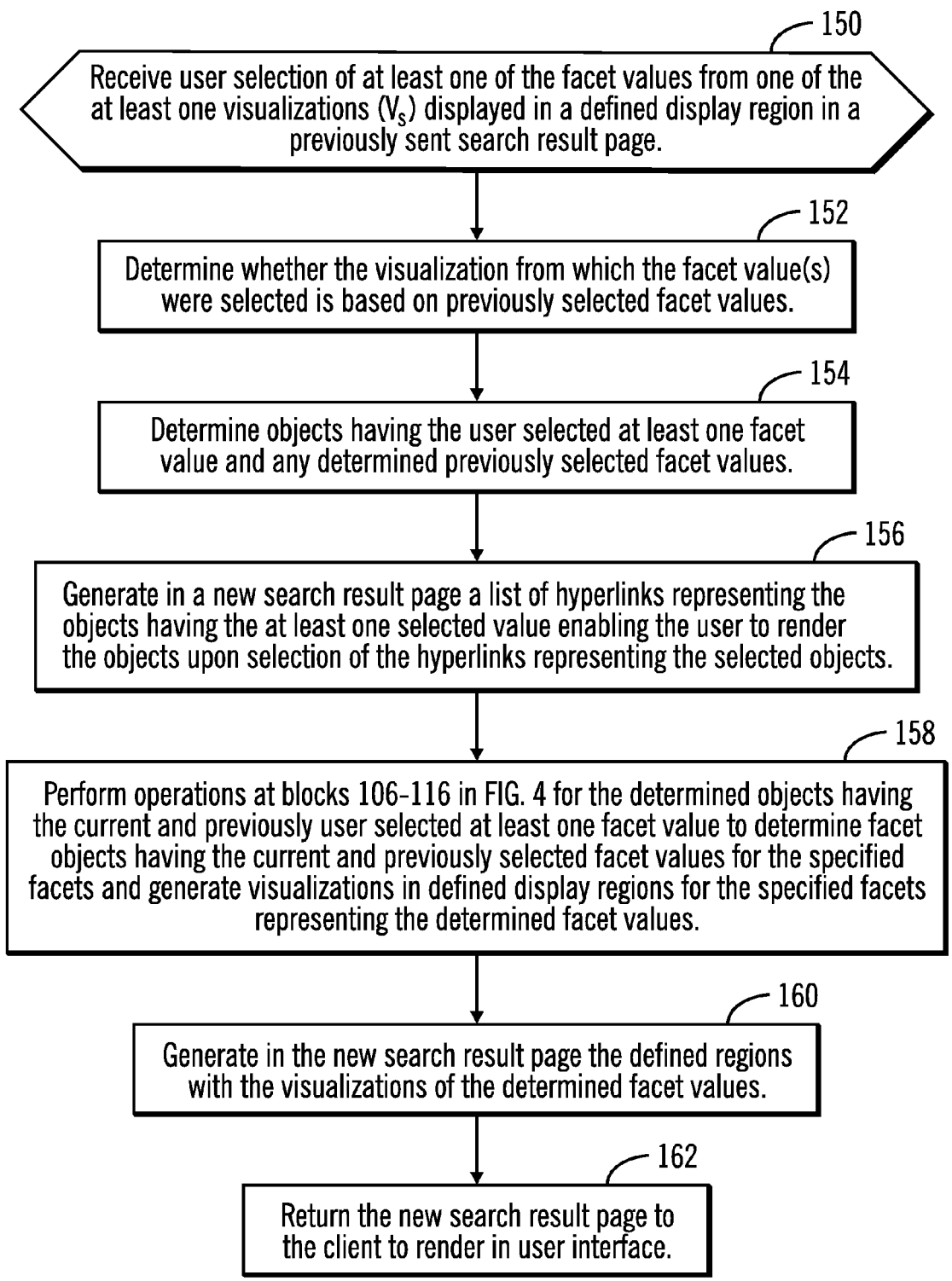
FIG. 5 illustrates an embodiment of operations to generate visualizations of facet values for user selected facets and facet values.

FIG. 5 illustrates an embodiment of operations performed by the search processor 18, or other component of the content analytics system 2, in response to a user at the user interface 20 selecting one or more of the facet values from one of the visualizations displayed in a defined display region of a previously returned search result page 22, which previously returned search result page may be generated according to the operations of FIG. 4 or FIG. 5. Upon receiving (at block 150) user selection of at least one of the facet values from one of the at least one selected visualizations ($V_s$) displayed in a defined display region in a previously returned search result page 22, the search processor 18 determines (at block 152) whether the visualization ($V_s$) from which the facet value(s) were selected is based on previously selected facet values, such as the facet values are from documents that include previously selected user facet values. The search processor 18 determines (at block 154) objects 8 having the current user selected at least one facet value from the selected visualization ($V_s$) and any previously selected facet values, such that all the facet values in the selected visualization ($V_s$) are from objects having the previously selected facet values that resulted in the visualization ($V_s$). The index 11 may be processed to find index entries 70 having the user selected and previously selected facet values in field 74, and then the objects 8 having those facet values comprise the objects that are present in all the index entries 70 for the user selected facet values (previous and current). Objects present in less than all the index entries for the user selected facet values would not satisfy the AND condition and may not be returned.

The search processor 18 may generate (at block 156) a new search result page 22 including a list of hyperlinks representing the objects 8 having the at least one selected value and any previously selected facet values. The user may access the user interface 20 to select the hyperlinks to render the content of the objects 8 upon selection of the hyperlinks representing the selected objects 8.

The search processor 18 may perform (at block 158) the operations at blocks 106 through 116 in FIG. 4 for the determined objects having the user selected at least one value, and any previously selected facet values, to determine facet values in the determined objects for the specified facets and generate visualizations in defined display regions for the specified facets representing the determined facet values. Each of the defined display regions, e.g., word clouds, may display facet values for one of the visualizations for one of the facets. The defined display regions with the visualizations of the determined facet values may be generated (at block 160) in the new search result page 22, which is returned (at block 162) to the client user interface 20 to render for the user at the user interface 20 to select objects form the hyperlinks and select new facet values in the defined display region in the search result page 22 to cause the performing of another iteration of the operations of FIG. 5 for newly selected facet values from the defined display region in the search result page.

In the operations of FIGS. 4 and 5, if there are multiple visualizations for different facets, then the user may select facet values from different display regions for different facets, and the search processor 18 would determine objects having the selected facet values for different facets to be used to determine facet values for the one or more defined display regions being generated for the new visualizations. Further, after receiving a search result page, the user may continue to select further facet values to perform another iteration of the operations of FIG. 5 to further refine the set of objects used to generate the visualization, and provide a more focused visualization.

Figure 6:
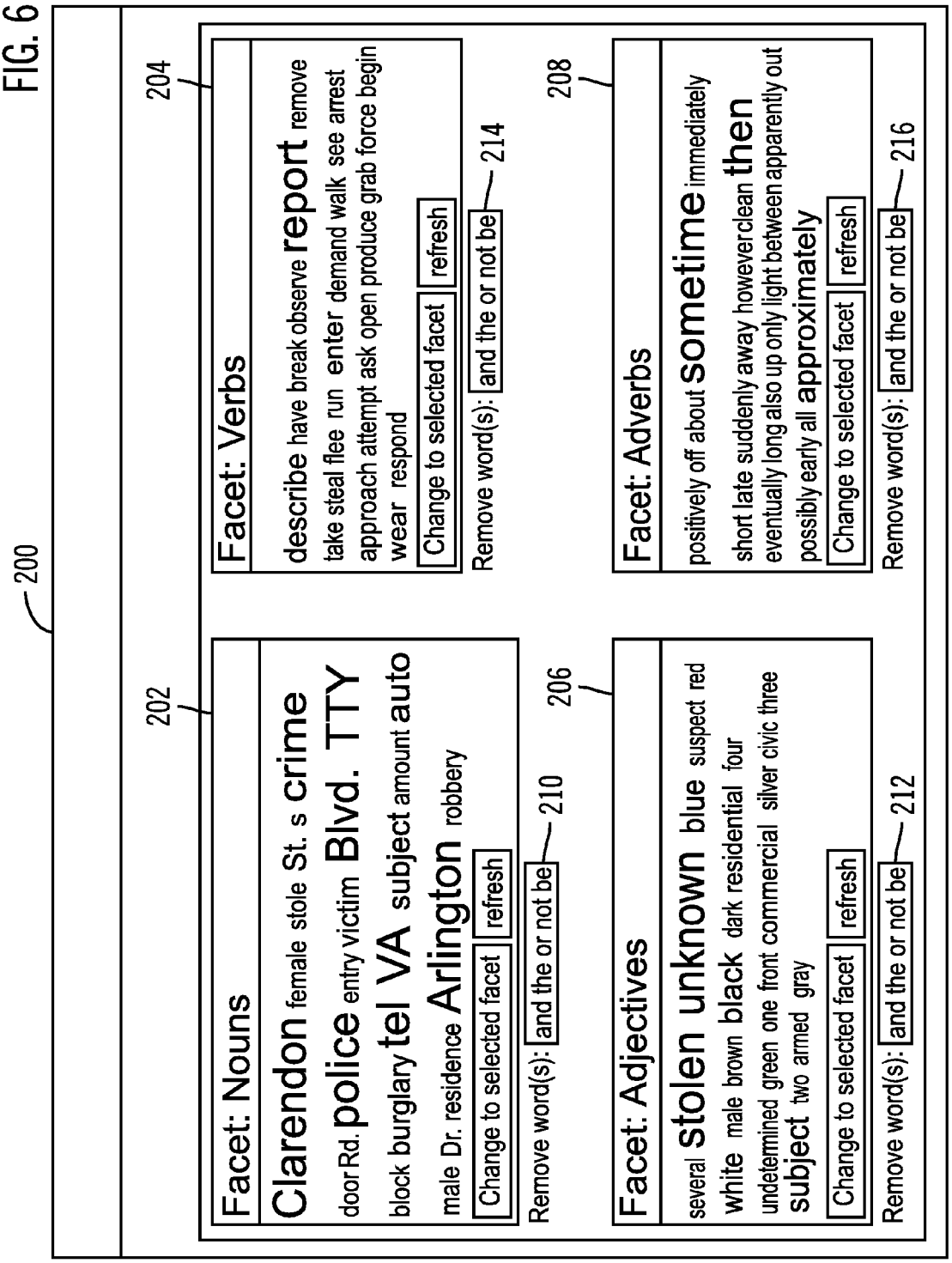
FIG. 6 illustrates an embodiment of visualizations of facet values.

FIG. 6 illustrates an example of a template 200 displaying multiple defined display regions 202, 204, 206, 208 for different visualizations for different facets, including a nouns, verbs, adjectives and adverb facets which renders all facet values from objects having the user specified facet values. The display regions 202, 204, 206, 208 may comprise the first generated display regions according to FIG. 4 or a subsequently generated display region based on current and previous user selected facet values according to the operations of FIG. 5. Further, in the embodiment of FIG. 6, for each defined display region 202, 204, 206, 208, a user entered stop word list 210, 212, 214, 216 or remove word list is provided to allow the user to specify words that will not be included in the visualized facet values.

Described embodiments provide methods, systems, and computer program products to provide a visualization of facet values for one or more user selected facets that are associated with objects. The facet values for the one or more user selected facets may be visualized in one or more display regions. A user may select one or more facet values in the visualization to cause a determination to be made of objects including the selected one or more facet values. A determination is then made of the facet values in the determined objects for the one or more user selected objects to present in a new visualization of facet values for the objects.

Described embodiments provide a visualization of facet values associated with objects by displaying the facet values in the objects for different facets in different display regions, such as different word clouds. In certain embodiments, a matrix of word clouds is used to represent facets and dimensions for visualization. This presents a large amount of data from several different facets in a compact view, allowing the human brain to scan the represented facet values to discover insights or to drill-down into a facet or dimension to see how the other facets change based on the query. Since text mining is heavily dependent on the words used in a corpus, word clouds are useful to visualize the results of text mining and text analytics applications. Described embodiments allow the user to visualize the most important words across many different facets of the data (e.g., parts of speech). Increasing the number of defined display regions, such as word clouds or sub-clouds, increases the ability to visualize the important facet values for different facets.

Described embodiments further increase the opportunity for cognitive insight based on the human brain's ability to quickly make connections between visual elements by presenting facet values in defined display regions for different facets with the ability to drill down by selecting keywords or phrases, and by regenerating the visualization to have the user selected facet values reflected immediately in the display regions (word clouds) for all visualized facets. Described embodiments are particularly useful for text analytics, especially when facets or dimensions from linguistic and concept analysis are rendered along with other facets which are extracted facts or metadata.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 7:
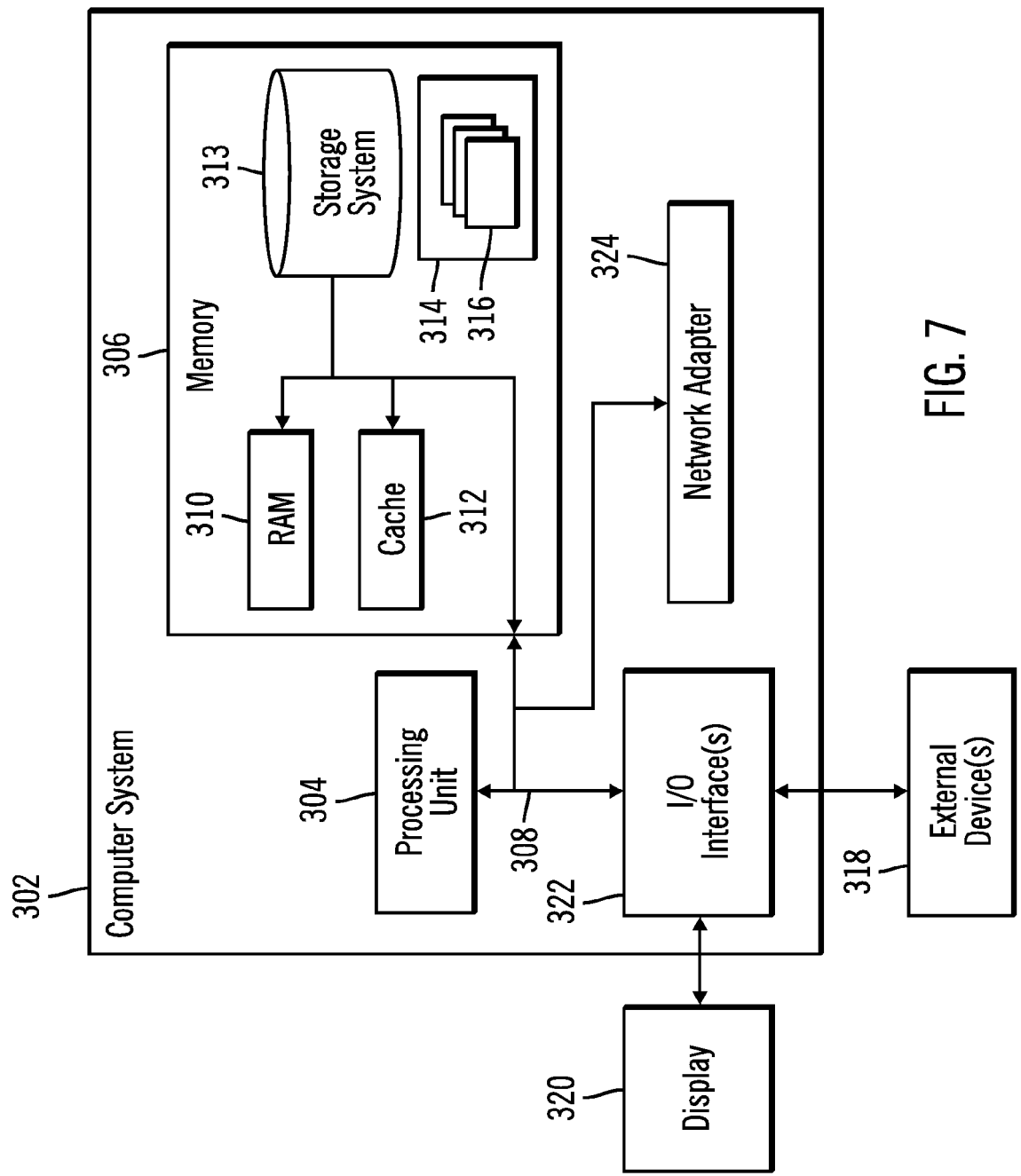
FIG. 7 illustrates an embodiment of a computing architecture.

The elements of the computing environment of FIG. 1, including the object processor 12, search processor 18, indexer 14, and text miner 16 may be implemented in one or more computer systems, such as the computer system 302 shown in FIG. 7. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 316 which generally carry out the functions and/or methodologies of embodiments of the invention as described herein. The components 12, 14, 16, and 18 of the content analytics system 2 may be implemented in one or more computer systems 302, where if they are implemented in multiple computer systems 302, then the computer systems may communicate over a network.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for rendering information on facets associated with objects, the computer program product comprising a non-transitory computer readable storage medium having computer readable program code embodied therein capable of being executed to perform operations comprising:
   processing the objects to determine facet types for which the objects have facet values;
   receiving selection of at least one of the determined facet types;
   processing the objects to determine facet values for the objects for at least one of the selected facet types;
   generating a first visualization in a user interface of representations of the determined facet values for the objects, wherein the facet values for each facet type are displayed in a separate display region of a plurality of display regions, wherein each of the display regions corresponds to one of the facet types, and wherein each of the display regions groups facet values for each of the plurality of facet types;
   receiving user selection of at least one of the facet values represented in the generated first visualization for at least one of the facet types represented in the at least display region;
   determining the objects having the at least one selected facet value;
   determining at least one facet type having the at least one selected facet value;
   determining facet values for the determined at least one facet type in each of the determined objects, wherein the determined facet values comprise the facet values for the determined at least one facet type in the determined objects in addition to the at least one selected facet value in the first visualization; and generating a second visualization in the user interface of representations of the determined facet values in the determined objects having the at least one selected facet value in at least one display region for the determined at least one facet type to refine the objects used to generate the second visualization, wherein each of the at least one display region in the second visualization groups the determined and selected facet values for each of the determined at least one facet type.

2. The computer program product of claim 1, wherein the at least one selected facet value from the first visualization comprises a first selected facet value, wherein the operations further comprise:
receiving user selection of a second selected facet value comprising one of the at least one facet values represented in the generated second visualization;
determining objects having the first selected facet value and the second selected facet value for the specified facet type;
determining at least one facet value for the specified facet type for the determined objects having the first and second selected facet values; and
generating a third visualization of representations of the determined at least one facet value for the determined objects having the first and second selected facet values.

3. The computer program product of claim 1, wherein the operations further comprise:
generating a list of hyperlinks representing the objects having the at least one selected facet value enabling the user to render the objects upon selection of the hyperlinks representing the selected objects.

4. The computer program product of claim 1, wherein the operations further comprise:
rendering a list of a plurality of facet types; and
receiving user selection of one of the listed facet types, wherein the selected at least one facet type comprises the user selected facet type.

5. The computer program product of claim 1, wherein the representations of the facet values in the first and second visualizations provide different appearances of the facet values based on a frequency of the facet values in the determined objects that include the facet values.

6. The computer program product of claim 1, wherein the operations further comprise:
receiving user selection of at least one additional facet value represented in the first visualization, wherein the determining the objects having the at least one selected facet value comprises determining the objects having the at least one selected facet value and the selected at least one additional value, wherein the determining the at least one facet value of the determined objects comprises determining at least one facet value for the determined objects having the at least one selected facet value and the selected at least one additional value.

7. The computer program product of claim 1, wherein the processing of the objects to determine facet values is performed to determine facet values for a plurality of specified facet types, wherein the first visualization and the second visualization represent facet values in the objects for the specified facet types.

8. The computer program product of claim 7,
wherein generating the first visualization comprises generating a visualization of a separate defined display region for each of the specified facet types for which at least one facet value is determined, wherein each defined display region includes representations of the facet values for one of the specified facet types; and
wherein generating the second visualization comprises generating a visualization of a separate defined display region for each of the specified facet types for which at least one facet value is determined from the determined objects having the selected facet value, wherein each display region includes representations of facet values for one of the specified facet types.

9. The computer program product of claim 8, wherein the operations further comprise:
rendering a list of a plurality of facet types; and
receiving user selection of a plurality of the listed facet types, wherein the specified facet types comprise the user selected facet types.

10. The computer program product of claim 7, wherein the operations further comprise:
determining correlation values of the facet values for one of the facet types with facet values for at least one other facet type, wherein the visualization of the facet values in the first visualization provides different appearances of the facet values based on the correlation values of the facet values; and
determining correlation values of the facet values for one of the facet types with facet values for at least one other facet type from the determined objects having the selected facet value, wherein the visualization of the facet values in the second visualization provides different appearances of the facet values based on the correlation values determined for the facet values.

11. A system for rendering information on facets associated with objects in a repository, comprising:
a processor; and
a computer readable storage medium having code executed by the processor to perform operations, the operations comprising:
processing the objects to determine facet types for which the objects have facet values;
receiving selection of at least one of the determined facet types;
processing the objects to determine facet values for the objects for at least one of the selected facet types;
generating a first visualization in a user interface of representations of the determined facet values for the objects, wherein the facet values for each facet type are displayed in a separate display region of a plurality of display regions, wherein each of the display regions corresponds to one of the facet types, and wherein each of the display regions groups facet values for each of the plurality of facet types;
receiving user selection of at least one of the facet values represented in the generated first visualization for at least one of the facet types represented in the at least display region;
determining the objects having the at least one selected facet value;
determining at least one facet type having the at least one selected facet value;
determining facet values for the at least one facet type in each of the determined objects having, wherein the determined facet values comprise the facet values for the determined at least one facet type in the determined objects in addition to the at least one selected facet value in the first visualization; and
generating a second visualization in the user interface of representations of the determined facet values in the determined objects having at least one the selected facet value in at least one display region for the determined at least one facet type to refine the objects used to generate the second visualization, wherein each of the at least one display region in the second visualization groups the determined and selected facet values for each of the determined at least one facet type.

12. The system of claim 11, wherein the at least one selected facet value from the first visualization comprises a first selected facet value, wherein the operations further comprise:
  receiving user selection of a second selected facet value comprising one of the at least one facet values represented in the generated second visualization;
  determining objects having the first selected facet value and the second selected facet value for the specified facet type;
  determining at least one facet value for the specified facet type for the determined objects having the first and second selected facet values; and
  generating a third visualization of representations of the determined at least one facet value for the determined objects having the first and second selected facet values.

13. The system of claim 11, wherein the operations further comprise:
  rendering a list of a plurality of facet types; and
  receiving user selection of one of the listed facet type, wherein the selected at least one facet type comprises the user selected facet type.

14. The system of claim 11, wherein the representations of the facet values in the first and second visualizations provide different appearances of the facet values based on a frequency of the facet values in the determined objects that include the facet values.

15. The system of claim 11, wherein the operations further comprise:
  receiving user selection of at least one additional facet value represented in the first visualization, wherein the determining the objects having the at least one selected facet value comprises determining the objects having the at least one selected facet value and the selected at least one additional value, wherein the determining the at least one facet value of the determined objects comprises determining at least one facet value for the determined objects having the at least one selected facet value and the selected at least one additional value.

16. The system of claim 11, wherein the processing of the objects to determine facet values is performed to determine facet values for a plurality of specified facet types, wherein the first visualization and the second visualization represent facet values in the objects for the specified facet types.

17. The system of claim 16,
  wherein generating the first visualization comprises generating a visualization of a separate defined display region for each of the specified facet types for which at least one facet value is determined, wherein each defined display region includes representations of the facet values for one of the specified facet types; and
  wherein generating the second visualization comprises generating a visualization of a separate defined display region for each of the specified facet types for which at least one facet value is determined from the determined objects having the selected facet value, wherein each display region includes representations of facet values for one of the specified facet types.

18. The system of claim 16, wherein the operations further comprise:
  determining correlation values of the facet values for one of the facet types with facet values for at least one other facet types, wherein the visualization of the facet values in the first visualization provides different appearances of the facet values based on the correlation values of the facet values; and
  determining correlation values of the facet values for one of the facet types with facet values for at least one other facet types from the determined objects having the selected facet value, wherein the visualization of the facet values in the second visualization provides different appearances of the facet values based on the correlation values determined for the facet values.

19. A method for rendering information on facets associated with objects, comprising:
  processing the objects to determine facet types for which the objects have facet values;
  receiving selection of at least one of the determined facet types;
  processing the objects to determine facet values for the objects for at least one of the selected facet types;
  generating in a computer readable storage medium a first visualization in a user interface of representations of the determined facet values for the objects, wherein the facet values for each facet type are displayed in a separate display region of a plurality of display regions, wherein each of the display regions corresponds to one of the facet types, and wherein each of the display regions groups facet values for each of the plurality of facet types;
  receiving user selection of at least one of the facet values represented in the generated first visualization for at least one of the facet types represented in the at least display region;
  determining objects having the at least one selected facet value;
  determining at least one facet type having the at least one selected facet value;
  determining facet values for the determined at least one facet type in each of the determined objects, wherein the determined facet values comprise the facet values for the determined at least one facet type in the determined objects in addition to the at least one selected facet value in the first visualization; and
  generating a second visualization in the user interface of representations of the determined facet values in the determined objects having the at least one selected facet value in at least one display region for the determined at least one facet type to refine the objects used to generate the second visualization, wherein each of the at least one display region in the second visualization groups the determined and selected facet values for each of the determined at least one facet type.

20. The method of claim 19, wherein the at least one selected facet value from the first visualization comprises a first selected facet value, further comprising:
  receiving user selection of a second selected facet value comprising one of the at least one facet values represented in the generated second visualization;
  determining objects having the first selected facet value and the second selected facet value for the specified facet type;
  determining at least one facet value for the specified facet type for the determined objects having the first and second selected facet values; and
  generating a third visualization of representations of the determined at least one facet value for the determined objects having the first and second selected facet values.

21. The method of claim 19, further comprising:

rendering a list of a plurality of facet types; and receiving user selection of one of the listed facet types, wherein the selected at least one facet type comprises the user selected facet type.

22. The method of claim 19, wherein the representations of the facet values in the first and second visualizations provide different appearances of the facet values based on a frequency of the facet values in the determined objects that include the facet values.

23. The method of claim 19, further comprising:

receiving user selection of at least one additional facet value represented in the first visualization, wherein the determining the objects having the at least one selected facet value comprises determining the objects having the at least one selected facet value and the selected at least one additional value, wherein the determining the at least one facet value of the determined objects comprises determining at least one facet value for the determined objects having the at least one selected facet value and the selected at least one additional value.

24. The method of claim 19, wherein the processing of the objects to determine facet values is performed to determine facet values for a plurality of specified facet types, wherein the first visualization and the second visualization represent facet values in the objects for the specified facet types.

25. The method of claim 24, wherein generating the first visualization comprises generating a visualization of a separate defined display region for each of the specified facet types for which at least one facet value is determined, wherein each defined display region includes representations of the facet values for one of the specified facet types; and wherein generating the second visualization comprises generating a visualization of a separate defined display region for each of the specified facet types for which at least one facet value is determined from the determined objects having the selected facet value, wherein each display region includes representations of facet values for one of the specified facet types.

26. The method of claim 24, further comprising:

determining correlation values of the facet values for one of the facet types with facet values for at least one other facet type, wherein the visualization of the facet values in the first visualization provides different appearances of the facet values based on the correlation values of the facet values; and determining correlation values of the facet values for one of the facet types with facet values for at least one other facet type from the determined objects having the selected facet value, wherein the visualization of the facet values in the second visualization provides different appearances of the facet values based on the correlation values determined for the facet values.

* * * * *